UNITED STATES PATENT OFFICE.

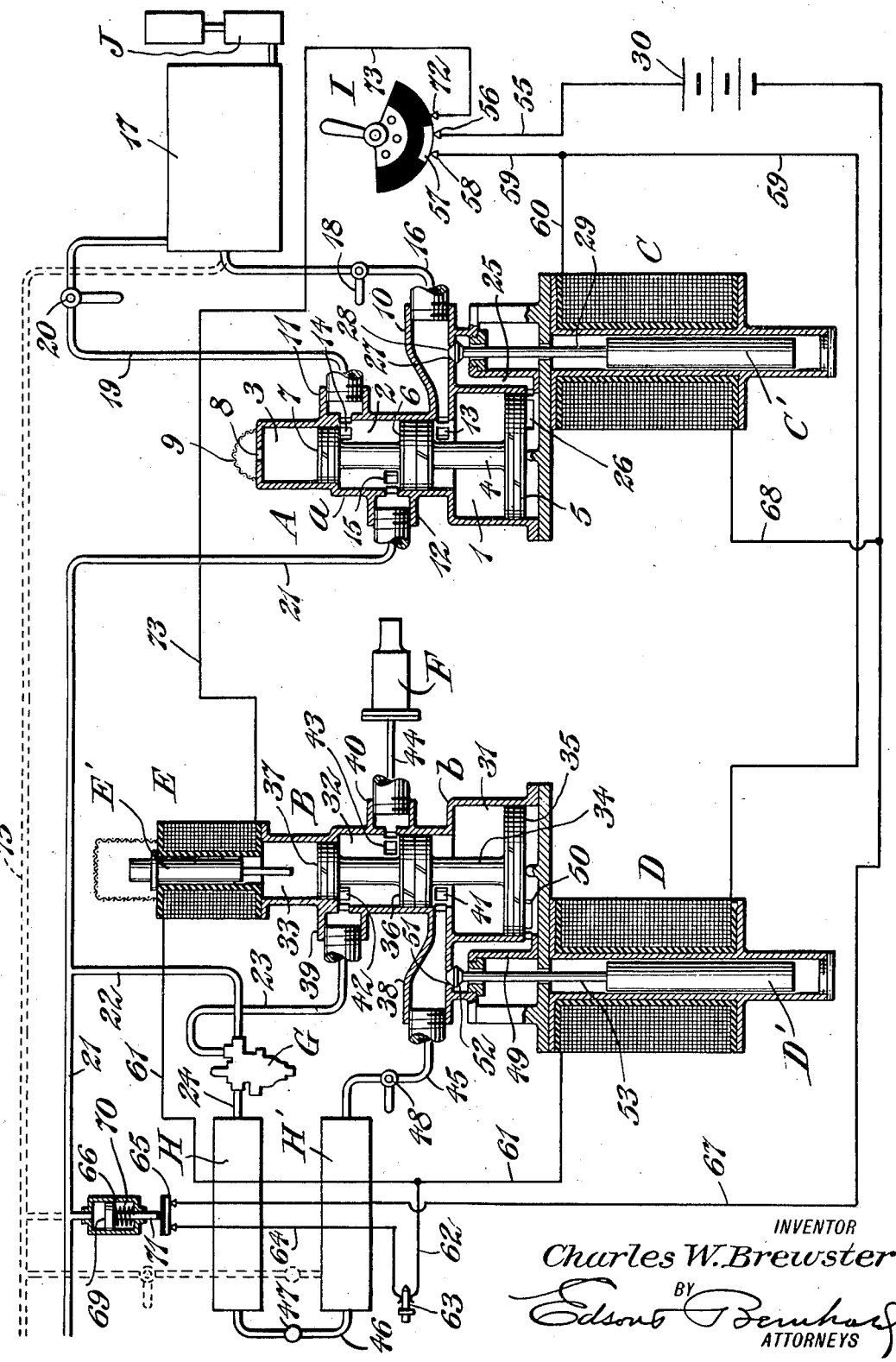

CHARLES W. BREWSTER, OF NEW YORK, N. Y.

ELECTRICALLY-OPERATED BRAKE MECHANISM.

1,308,619.          Specification of Letters Patent.          Patented July 1, 1919.

Application filed November 25, 1916. Serial No. 133,297.

*To all whom it may concern:*

Be it known that I, CHARLES W. BREWSTER, a citizen of the United States, residing at the city of New York, borough of Manhattan, county and State of New York, have invented a certain new and useful Electrically-Operated Brake Mechanism, of which the following is a specification.

This invention is a brake mechanism for railways, the salient feature of which consists in electrical means for operating certain piston valves which control the flow of air from a reservoir to the brake cylinders.

A further feature of the invention consists of electrical means for controlling automatically the travel of the piston valve in a manner to retain the air supplied to the brake cylinder under pressure within said brake cylinder, said valve-controlling means and the electrical operating means heretofore mentioned working in harmony and each being controllable, preferably, from a single manually operable device for the purpose of increasing, decreasing, or retaining the pressure within the brake cylinder so as to place the brake under the control of the driver and enable him to reduce the speed of the car as the exigencies of the service may require.

Other features and functions of the invention will appear from the following description, taken in connection with the accompanying drawing, wherein—

The figure illustrates diagrammatically a brake mechanism embodying this invention.

On the motor car or engine is installed a brake equipment comprising a triple valve A and an electrical operating means therefor in the form of a solenoid C together with means for connecting said triple valve with the usual air brake equipment and other means for including the solenoid in the electrical circuits, as will hereafter appear.

Each car of a train other than the motor car or engine first referred to is equipped with a triple piston valve B, a solenoid D, and the usual brake cylinder F; and in addition thereto each car is supplied with a second solenoid E, the latter being positioned in operative relation to the triple valve B on said car for the purpose of so governing or controlling valve B as to retain under a predetermined pressure the air supplied to the brake cylinder F by the normal operation of the valve B.

The triple valve A on the motor car or engine comprises a stationary casing *a* provided with chambers 1, 2, 3 of different cross sectional area, together with a moving element in the form of a stem 4 provided with pistons 5, 6, 7, also of different areas; said pistons working in the respective chambers, as shown. The detailed construction of the casing and of the triple valve may be modified as desired by a skilled constructor, but as shown the chamber 3 is open to the atmosphere by the port 8, covered with a dust-excluding cap 9.

The valve casing *a* is provided with three several pipe connections 10, 11, 12 in communication with chambers 1 and 2 by way of ports 13, 14 and 15, as shown. To the connection 10 is attached a pipe 16 leading from the usual air reservoir 17, the air in which is maintained at the required working pressure by a normally acting pump J, said pipe 16 having a shut-off valve 18. A pipe 19 is attached to connection 11 and affords a path by which air from reservoir 17 is supplied to chamber 2 of the triple valve, said pipe 19 being provided with the usual engineer's brake valve 20. Air from the reservoir 17 is supplied to the chamber 1 by the pipe 16 and the ports 13 of connection 10, whereby the air acts upon pistons 5, 6, 7 to retain the triple valve A normally in the down position shown, for the reason that the area of piston 5 exceeds the area of pistons 6, 7. The triple valve A on the motor car or engine is connected by a main line train pipe 21 with the triple valve B on the other car or cars, one end of said main line pipe 21 being attached to the connection 12 of triple valve A and the said main line pipe 21 being connected by a branch 22 with the usual service triple valve G, from which latter extends two branch pipes 23, 24, the function of which will presently appear.

The casing *a* of the triple valve A is provided, further, with a by-pass 25 which terminates in a port or ports 26 at the bottom part of chamber 1 and below the larger piston 5 of the three pistons constituting the movable element of said triple valve A. Said by-pass communicates through a port 27 with the chamber of pipe connection 10 so that at the proper time or times air from reservoir 17 may be admitted to chamber 1 below piston 5 in order to impart travel in an upward direction to the movable element of said triple valve A. This communication of the by-pass with the chamber of connection 10 is normally cut off by a valve head 28 on the stem 29 of plunger C' associated with the solenoid C, the coil of which is normally energized by current from a source of supply, such as battery 30.

The triple valve B on each car other than the motor car or engine is, in the main, similar to valve A; said valve B comprising a stationary casing $b$ provided with chambers 31, 32, 33 of different cross sectional areas and a movable element embodied in the form of a stem 34 having pistons 35, 36, 37 also of different areas and working in the respective chambers of the casing $b$. Like the casing of valve A, the valve casing $b$ is provided with connections 38, 39 and 40 arranged as follows:—connection 38 has ports 41 in communication with chamber 31 above the piston 35; connection 39 has ports 42 opening into chamber 32 near its top, and connection 40 has ports 43 opening into chamber 32 intermediate the ends thereof. To the connection 40 is attached a pipe 44 connected to brake cylinder F; to the connection 39 is attached the branch pipe 23 leading from the service triple valve G, from which valve G the pipe 24 leads to the auxiliary reservoir H, as is usual; and to the connection 38 is secured a pipe 45 provided with a stop cock 48 and leading to a second auxiliary reservoir H', the latter being connected to and charged from auxiliary reservoir H by a pipe 46 provided with a check valve 47. Valve casing $b$ is provided, further, with a by-pass 49, the lower part of which opens by ports 50 into the chamber 31 below the larger (35) of the three pistons of valve B, said by-pass being adapted for communication at proper times with the chamber of connection 38 by a port 51. This port is closed normally by a valve head 52 on the stem 53 of the solenoid plunger D', the coil of which solenoid D is normally energized from the same source of energy (battery 30) as the solenoid C. The solenoids C D are in parallel in a circuit which includes battery 30 and a single controlling device in the form of a switch I, the connections being as follows:— From the positive side of the battery a conductor 55 leads to a contact 56 adapted to make connection with a plate 57 of switch I, said plate being also in electrical connection with an adjacent contact 58 from which leads a conductor 59, the latter having a branch connection 60 to the coil of solenoid C and running to the coil of solenoid D; from solenoid D extends a conductor 61, from which is branched a conductor 62 that coöperates with a plug switch 63, from which a conductor 64 leads to a switch 65 of a safety vent 66 in the main line train pipe 21; from this switch 65 a common return 67 leads to the negative side of the battery, and onto this return 67 is branched a conductor 68 from the coil of solenoid C, thus completing the circuit of solenoids C, D, battery 30 and hand switch I.

The safety vent 66 is attached directly to the main train line 21, and said vent includes a piston valve 69 exposed to the working pressure of said main train line, said piston valve being actuated, in the event of a reduction of the pressure in the main line below a predetermined minimum, by a spring 70; but in working condition the pressure of the main train line is such as to overcome the resistance of the spring and retain the stem 71 of the piston valve in contact with the switch 65 and thus bridge the gap between the contacts of conductors 64, 67, as shown.

As illustrated, magnet E is mounted directly over the chamber 33 of each valve casing $b$, and within this magnet operates the core or plunger E', the lower end portion of which extends into the chamber 33 and thus is in coöperative relation to the moving element of the triple valve B, whereby the core or plunger E' operates, under certain conditions, to limit or arrest the upward travel of the moving element of valve B in a manner for the piston 36 to stop when across the ports 43 and thereby shut off communication from brake cylinder F with chamber 32 of the valve B, whereby the braking fluid in cylinder F is retained therein at whatever pressure said braking fluid may have been supplied to the brake cylinder.

Said magnet E is included in the circuit with switch I and battery 30 as follows:—A contact 72 is positioned adjacent contacts 58, 56, so as to make electrical connection with switch plate 57; from this contact a conductor 73 leads to the coil of magnet E, and from this coil the return conductor 67 leads to the negative side of the battery 30.

The operation is as follows:—

The brake cylinder is normally vented to atmosphere through the service triple valve. With switch I in normal position and with solenoids C D energized and plungers C' D' raised to close the valves 28, 52, the braking fluid is supplied from reservoir 17 through pipe 19, the chamber 2 of motor car valve A, pipe 21, to service triple valve G and through pipe 24, auxiliary reservoirs H H' and pipe 45 to trailer car triple valve B on each car of the train, but to apply each brake the operator turns the handle of switch I toward the left, thus shifting plate 57 away from contacts 56 and 58, as a result of which solenoids C D are deënergized, magnet E being neutral. The plungers C' D' drop by gravity and valves 28, 52 are opened, thus admitting the braking fluid through all the by-passes 25, 49, to the bottom chambers 1, 31 of triple valves A B below the pistons 5, 35, respectively, whereby the movable elements of the triple valves A B are lifted. In valve A the pistons are raised for piston 6 to lie above the ports 15 and below ports 14, and the braking fluid is cut off from pipe 19 to pipe 21 but is free to flow through pipe 16, ports 13, chamber 2 and the main line 21 to the trailer car or cars. The flow of braking fluid through service triple valve G into the reservoirs H H' and through pipe 45 into chamber 32 (the piston 36 of each valve B being raised above ports 43) admits the braking fluid into cylinder F, thus applying the brakes.

Assuming that braking fluid at the required pressure has been admitted to the brake cylinders, and that it is desired to retain said fluid at such pressure within the brake cylinder in order to retain the brakes applied for an appreciable length of time within the judgment of the driver, the switch I is shifted to the right for contact 57 to bridge contacts 56, 72, thus energizing magnet E, attracting plunger E', the downward movement of which depresses the movable element of valve B so that the piston 36 covers the ports 43 and cuts off the flow of air between the brake cylinder and valve B, thus holding the braking fluid under pressure within the brake cylinder as recited.

Should it be desired from time to time to increase the pressure in the brake cylinders, the driver shifts the switch I to the left, thus removing the contact 57 from all contacts 72, 57, 58, deënergizing magnet E on all the cars, and permitting the moving elements of valves B to be raised sufficiently for the braking fluid to flow into the brake cylinders in order to increase the pressure therein.

To release the brakes, the switch I is turned to the right for contact 57 to bridge contacts 56, 58, energizing the solenoids so that the valves 28, 52 are closed and the movable elements of valves A B are forced down by air and by gravity, the by-passes 25, 49 being vented to atmosphere and the brake cylinders being vented to atmosphere through passages provided by loosely fitting the valve stems 29, 53 in the guide openings provided for the movement of said two named stems in the cylinders 1, 31, as shown.

The hand switch I may thus be operated one or more times so as to control the brake system in a manner to vary the working pressure of the braking fluid admitted to the brake cylinder or cylinders, and, if desired, the plunger of magnet E may be controlled so as to depress the movable element of valves B so as to retain the braking fluid with the brake cylinders at the pressure at which said fluid is supplied to said cylinders, thus enabling the engine driver to retard the speed of the train as desired.

Instead of feeding the braking fluid to the second auxiliary reservoir H' from the reservoir H as described, I may utilize a direct pipe connection, shown in dotted lines at 75, between the main reservoir 17 and reservoir H'.

Having thus fully described the invention, what I claim as new, and desire to secure by Letters Patent is:

1. In a brake system, a valve provided with a by-pass, said valve having means for establishing communication with a source of fluid pressure, a second valve provided with a by-pass, said second valve having means for establishing communication with a brake cylinder, means whereby said second valve is responsive to the control of the first valve, and electrically-controlled valves for controlling the flow of the braking fluid within the by-passes of said first and second valves whereby said valves are operated for feeding the braking fluid through the second valve to the brake cylinder.

2. In a brake system, a valve provided with a by-pass, said valve having means for establishing communication with a main reservoir, a second valve provided with a by-pass, said second valve having means for establishing communication with a brake cylinder and with an auxiliary reservoir, means whereby the second valve is operated in response to the control by the first valve, and electrically operated valves for controlling the by-passes of the first valve and the second valve so that the braking fluid will flow to the brake cylinder through the two said valves.

3. In a brake system, a valve provided with a by-pass, a second valve also provided with a by-pass, a brake cylinder controllable by the second valve, means for opening and closing the by-passes of the first valve and the second valve, and means for limiting the movement of the second valve for shutting off communication between the brake cylinder and the second valve whereby the braking fluid at a predetermined pressure may be retained in the brake cylinder.

4. In a brake system, a valve, a brake cylinder, a second valve connected with the brake cylinder, means whereby the second valve is rendered responsive to the control of the first valve, and means for limiting the operation of the second valve so as to retain a braking fluid at a predetermined pressure within the brake cylinder.

5. In a brake system, a valve provided with a by-pass, a brake cylinder, a second valve connected with the brake cylinder, said second valve having a by-pass, electrically operated means whereby the second valve is rendered responsive to the control of the first valve, and other electrically operated means for limiting the operation of the second valve so as to retain a braking fluid under pressure in the brake cylinder.

6. In a brake system, a valve provided with a by-pass, a brake cylinder, a second valve connected with the brake cylinder, said second valve having a by-pass, electrically operated means whereby the second valve is rendered responsive to the control of the first valve, and other electrically operated means for limiting the operation of the second valve so as to retain a braking fluid under pressure in the brake cylinder, said second named electrically operated means being brought into action subsequently to the operation of the first named electrically operated means.

7. In a brake system, a valve, a brake cylinder, a second valve connected with the brake cylinder, a plurality of electrically operated valves in coöperative relation to the first valve and the second valve for rendering the second valve responsive to the control of the first valve, an electrically operated member for limiting the operation of the second valve and retaining a braking fluid within the brake cylinder, and a single controlling device for the electrically operated valves and the electrically operated member.

8. In a brake system, a triple valve having a by-pass, a reservoir having independent connections with said first valve, a brake cylinder, a second triple valve having a by-pass, means connecting the second triple valve and the brake cylinder, a main brake line including a service triple valve and an auxiliary reservoir, valves in operative relation to the by-passes of the first valve and the second triple valve, and means for operating the by-pass valves.

9. In a brake system, a triple valve having a by-pass, a reservoir having independent connections with said first valve, a brake cylinder, a second triple valve having a by-pass means connecting the second triple valve and the brake cylinder, a main brake line including a service triple valve and an auxiliary reservoir, electrically operated valves for controlling the by-passes of the first triple valve and the second triple valve, and a single operating device in circuit with said electrically operated valves.

10. In a brake system, a triple valve provided with a by-pass, said triple valve having a plurality of connections with a main reservoir, a second triple valve provided with a by-pass, said second triple valve having a plurality of connections for establishing communication with an auxiliary reservoir and an independent connection with a brake cylinder, and means for controlling the by-pass of the second triple valve concurrently with the control of the by-pass of the first triple valve so that the braking fluid will flow to the brake cylinder through the two said valves.

In testimony whereof I have hereunto signed my name.

CHARLES W. BREWSTER.